(12) United States Patent
Hirsch et al.

(10) Patent No.: US 7,471,667 B2
(45) Date of Patent: Dec. 30, 2008

(54) COEXISTENCE OF MODULATION SCHEMES IN A WLAN

(75) Inventors: Olaf Hirsch, Sunnyvale, CA (US); Atul Kumar Garg, San Jose, CA (US); Sunghyun Choi, Montvale, NJ (US); Abraham Jan de Bart, Nuenen (NL); Paul Gruijters, Best (NL)

(73) Assignee: NXP B.V., Eindhoven (NL)

( * ) Notice: Subject to any disclaimer, the term of this patent is extended or adjusted under 35 U.S.C. 154(b) by 686 days.

(21) Appl. No.: 10/080,156

(22) Filed: Feb. 19, 2002

(65) Prior Publication Data

US 2003/0128684 A1  Jul. 10, 2003

Related U.S. Application Data

(60) Provisional application No. 60/346,991, filed on Jan. 9, 2002.

(51) Int. Cl.
*H04L 12/413* (2006.01)
*H04Q 7/20* (2006.01)

(52) U.S. Cl. .................. 370/348; 370/312; 370/329; 455/451; 455/452.1

(58) Field of Classification Search ................ 370/208, 370/278, 294, 312, 314, 329, 345–348, 477; 455/451, 451.1, 452.1
See application file for complete search history.

(56) References Cited

U.S. PATENT DOCUMENTS

| | | | |
|---|---|---|---|
| 6,717,926 B1 * | 4/2004 | Deboille et al. ............. 370/330 |
| 6,747,968 B1 * | 6/2004 | Seppala et al. .............. 370/338 |
| 6,842,605 B1 * | 1/2005 | Lappetelainen et al. .... 455/13.4 |
| 6,873,611 B2 * | 3/2005 | Rios ............................. 370/338 |
| 6,990,116 B1 * | 1/2006 | Young et al. ................. 370/445 |
| 7,031,249 B2 * | 4/2006 | Kowalski ..................... 370/203 |
| 7,046,649 B2 * | 5/2006 | Awater et al. ................ 370/338 |
| 7,054,296 B1 * | 5/2006 | Sorrells et al. .............. 370/338 |
| 7,054,329 B2 * | 5/2006 | Cervello et al. ............. 370/447 |
| 7,274,652 B1 * | 9/2007 | Webster et al. .............. 370/204 |
| 7,274,707 B2 * | 9/2007 | Choi et al. ................... 370/445 |
| 7,301,965 B2 * | 11/2007 | Cimini et al. ................ 370/470 |
| 7,305,004 B2 * | 12/2007 | Sherman ...................... 370/462 |
| 2002/0071449 A1 * | 6/2002 | Ho et al. ...................... 370/447 |
| 2002/0163928 A1 * | 11/2002 | Rudnick et al. .............. 370/444 |
| 2002/0163933 A1 * | 11/2002 | Benveniste ................... 370/465 |

(Continued)

FOREIGN PATENT DOCUMENTS

WO    WO 01/95579 A2 * 12/2001

OTHER PUBLICATIONS

Ranasinghe et al, Distributed contention-free traffic scheduling in IEEE 802.11 multimedia networks, 2001 IEEE, pp. 18-28.*

*Primary Examiner*—Chi H Pham
*Assistant Examiner*—Ahmed Elallam

(57) ABSTRACT

A local area network is provided where an OFDM station and DSSS/CCK station coexist. During a contention-free period both stations operate under the point coordination function rules as defined in the IEEE 802.11 specification. Both stations transmit data when polled by the access point. The contention-free period comprises a sub-contention period during which only the OFDM station communicate. During the sub-contention period the OFDM station operates under the distributed coordination function while the DSSS/CCK station waits to be polled by the access point before starting to communicate.

20 Claims, 3 Drawing Sheets

U.S. PATENT DOCUMENTS

| | | | |
|---|---|---|---|
| 2003/0086437 A1* | 5/2003 | Benveniste | 370/461 |
| 2003/0117984 A1* | 6/2003 | Gavette | 370/338 |
| 2003/0128659 A1* | 7/2003 | Hirsch et al. | 370/208 |
| 2003/0152058 A1* | 8/2003 | Cimini et al. | 370/338 |
| 2003/0161279 A1* | 8/2003 | Sherman | 370/328 |
| 2003/0161340 A1* | 8/2003 | Sherman | 370/445 |
| 2003/0169763 A1* | 9/2003 | Choi et al. | 370/462 |
| 2004/0095911 A1* | 5/2004 | Benveniste et al. | 370/338 |
| 2004/0141522 A1* | 7/2004 | Texerman et al. | 370/466 |
| 2004/0196822 A1* | 10/2004 | Proctor, Jr. | 370/349 |

* cited by examiner

COEXISTENCE OF MODULATION SCHEMES IN A WLAN

CROSS-REFERENCE TO RELATED APPLICATIONS

This application claims the benefit of U.S. Provisional Application No. 60/346,991, filed Jan. 9, 2002.

FIELD OF THE INVENTION

The invention pertains to wireless local area networks and to the coexistence of stations capable of different modulation schemes. The invention is particularly relevant to the coexistence and interoperability in a WLAN of stations capable of transmitting and receiving OFDM modulated data and stations capable of transmitting and receiving DSSS/CCK modulated data.

BACKGROUND ART

The IEEE 802.11 WLAN standard provides a number of physical layer options in terms of data rates, modulation types and spreading spectrum technologies. An extension of the IEEE 802.11 standard, namely IEEE 802.11a, defines requirements for a physical layer operating in the 5 GHz U-NII frequency and data rates ranging from 6 Mps to 54 Mps. IEEE 802.11a defines a physical layer based on the orthogonal frequency division multiplexing (OFDM). This physical layer is similar to the one defined by the European ETSI-HIPERLAN II (European Telecommunications Standards Institute-HiperLAN2). A second extension, IEEE 802.11b, defines a set of physical layers' specifications operating in the 2.4 GHz ISM frequency band up to 11 Mps. The direct sequence spread spectrum/complementary code keying (DSSS/CCK) physical layer is one of the three physical layers supported in the IEEE 802.11 standard and uses the 2.4 GHz frequency band as the RF transmission media.

The IEEE standard committee has created a working group TGg with the mission of developing a higher speed PHY extension to the 802.11b standard. The 802.11g standard will be compatible with the IEEE 802.11 MAC and will implement all mandatory portions of the IEEE 802.11b PHY standard. A scope of TGg is to provide a wireless LAN standard where stations communicating in OFDM modulation and legacy stations communicating in DSSS/CCK modulation coexist and communicate with each other.

Another extension IEEE 802.11e enhances the current 802.11 MAC to expand support for LAN applications with Quality of Service requirements. IEEE 802.11e enables direct communications from one station to another. Example applications include transport of voice, audio and video over 802.11 wireless networks, video conferencing, media stream distribution, enhanced security applications, and mobile and nomadic access applications.

SUMMARY OF THE INVENTION

It is an object of the invention to enable the interoperability of stations communicating in different modulations in a WLAN.

It is an object of the invention to enable the coexistence of OFDM stations and legacy DSSS/CCK stations in a IEEE 802.11 WLAN.

It is yet another object of the invention to provide a new timing structure for communications over a WLAN.

It is yet another object of the invention to allow OFDM stations to communicate according to a distributed coordination function during a contention-free period.

To this end, a system of the invention comprises a first and second stations capable of transmitting and receiving data modulated using respective first and second modulation schemes. The first modulation scheme may be a DSSS/CCK modulation and the second scheme may be an OFDM modulation. The system also comprises an access point for communicating wit the first and the second stations. The access point transmits a beacon frame indicating a beginning of a contention-free period followed by a contention period. In the invention, the contention-free period comprises a sub-contention period. During this sub-contention period, the second station transmits data modulated using the second modulation scheme, according to a distributed coordination function access mechanism.

Legacy station using the DSSS/CCK modulation in an 802.11 WLAN may not be configured to communicate correctly with other OFDM stations. Legacy stations may not detect OFDM communications during the contention period. Thus, legacy DSSS/CCK devices, which cannot decode OFDM modulated data, may not be able to follow the collision avoidance mechanism as defined in IEEE 802.11. Therefore the invention provides a solution to enable the coexistence, within the same WLAN, of legacy stations and OFDM stations. During the contention-free period, both first and second stations may communicate using the point coordination function rules defined in the 802.11 standard and both stations communicate when polled by the access point. The invention introduces a sub-contention period in the contention-free period. This sub-contention period is such that the second station may gain access to the medium according to the distributed coordination function access mechanism while the first station is still operating according to the point coordination function rules, i.e. the first station may communicate when polled by the access point. In one or more embodiments of the invention, the access point may decide not to poll the first station during the sub-contention period. The medium may thus be reserved for communications with the second station and other stations capable of communicating using the second modulation scheme only. The second station gains access to the medium by listening to it and competing for it with other stations using the second modulation scheme. An advantage of one or more embodiments of the invention is to enable OFDM modulated communications during the sub-contention period thereby achieving pure OFDM data traffic and high bit rates communications. Another advantage of one or more embodiments of the invention is that a receiving station, e.g. the access point, knows which modulation scheme is being used during the sub-contention period. Thus, a receiving station knows it will receive data according to the second modulation scheme. Such knowledge may allow to reduce data overhead and permits lowering the costs and power saving. Another advantage of a system of the invention is bandwidth efficiency.

In an embodiment of the invention, the sub-contention period occurs at the end of the contention-free period. Thus, during a first portion of the contention-free period, the first and the second stations operate according to the rules of the point coordination function. During the second and last portion of the contention-free period, i.e. the sub-contention period, the second station operates according to the rules of the distributed coordination function while the first station is still operating according to the rules of the point coordination function. The access point may be configured not to poll the first station during the sub-contention period.

In a further embodiment of the invention, the access point dynamically adjusts the duration of the sub-contention period. The adjustment may be done based on respective bandwidth requirements of both stations or the adjustment may be done based on a number of stations respectively communicating using the first or the second modulation scheme.

The invention also relates to an access point and a station in such a system.

BRIEF DESCRIPTION OF THE DRAWING

The invention is explained in further details, by way of examples, and with reference to the accompanying drawing wherein.

Elements within the drawing having similar or corresponding features are identified by like reference numerals.

DETAILED DESCRIPTION

Figure 1:
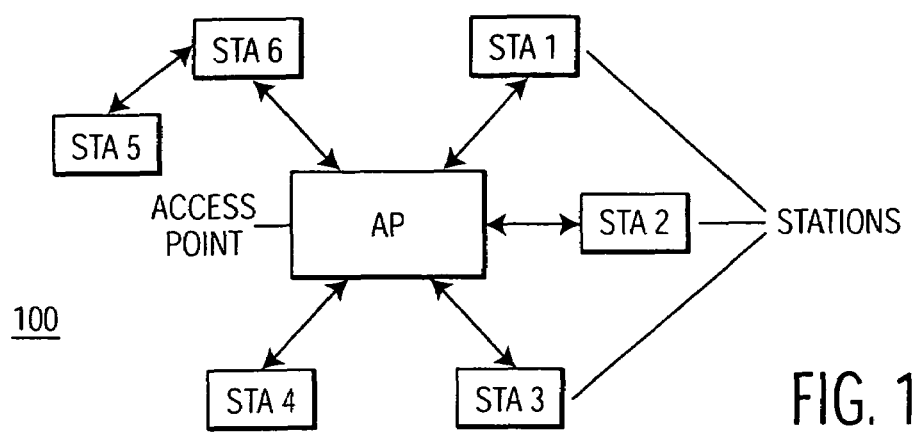
FIG. 1 shows a wireless local area network of the invention.

An 802.11 wireless local area network 100 of the invention as shown in FIG. 1 comprises an access point AP and a plurality of stations STA1-STA6. A station STA may communicate with another station directly as described in the IEEE 802.11e extension or a station STA may communicate with another station STA via the access point AP or the station STA may communicate with the access point AP only. The IEEE 802.11 specification describes two access mechanisms to the medium by the stations STA1-STA6: the distributed coordination function and the point coordination function.

Figure 2:
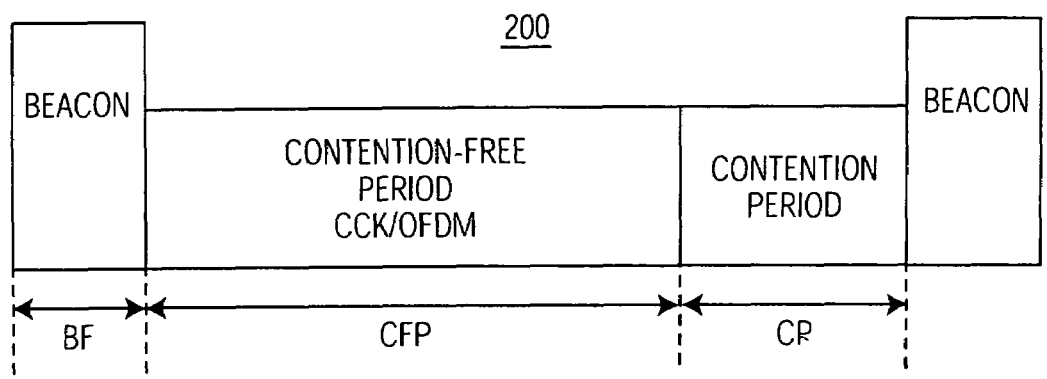
FIG. 2 is a timing diagram showing communication periods in a wireless local area network.

The point coordination function is a centrally controlled access mechanism and a point coordinator located in the access point AP controls the access of the stations STA1-STA6 to the medium. The stations STA1-STA6 request that the point coordinator or access point AP registers them on a polling list. The access point AP regularly polls the stations STA1-STA6 for traffic information and data to be transmitted while also transmitting data to the stations STA1-STA6. The access point AP begins a period of operation called the contention-free period CFP, as shown in FIG. 2, during which the point coordination function is operating. During this contention-free period CFP, access to the medium is completely controlled by the access point AP. The contention-free period CFP occurs periodically to provide a near-isochronous service to the stations STA1-STA6. The IEEE 802.11 specification also defines a contention period CP alternating with the contention-free period CFP during which the distributed coordination function rules operate and all stations may compete for access to the medium as will be explained hereinafter.

FIG. 2 is a timing diagram 200 showing a contention-free period CFP followed by a contention period CP. The contention-free period CFP begins when the access point AP gains access to the medium during a previous contention period CP using the distributed coordination function procedures. Upon gaining access to the medium, the access point AP transmits a beacon frame BF. The transmission of the beacon frame BF may be periodical, however the transmission of the beacon frame BF may be slightly delayed from an ideal start instant since the access point AP must compete for the medium according to the distributed coordination function rules.

During the contention-free period CFP, the access point AP has control of the medium and delivers traffic to stations STA1-STA6 and may poll stations STA1-STA6 that have requested contention-free service for them to deliver traffic to the access point AP. As a result, the traffic in the contention-free period CFP comprises frames sent from the access point AP to one or more of the stations STA1-STA6 followed by the acknowledgment from those stations. Every station STA may receive frames addressed to it by the access point AP and return an acknowledgment. The access point AP sends a contention-free poll (CF-Poll) frame to those stations STA1-STA6 that have requested contention-free service. If the station STA polled has traffic to send, it may transmit one frame for each contention-free poll CF-Poll received. If the station STA has no traffic to send, it may decide not to respond to the contention-free poll CF-Poll. The access point AP may send the contention-free poll CF-Poll addressed to a station together with data to be transmitted to that station.

The primary mechanism for preventing stations from accessing the medium during the contention-free period CFP is the network allocation vector (NAV) implemented by the IEEE 802.11 MAC. The NAV is a value that indicates to a station STA the amount of time that remains before the medium will become available. The NAV may be kept current in a station through duration values that are transmitted in all frames. The beacon frame BF sent by the access point AP at the beginning of the contention-free period CFP may contain information from the access point AP about the maximum expected length of the contention-free period CFP. A station STA receiving the beacon frame BF will enter this information into its NAV and is thus prevented from independently accessing the medium until the contention-free period CFP concludes or until the access point AP specifies otherwise to the station STA.

During the contention period CP, the basic access mechanism is the distributed coordination function, which uses carrier sense multiple access with collision avoidance. The stations STA1-STA6 sense the medium to see if it is already carrying a transmission. A station STA having its NAV set at zero waits until the medium is idle to start transmitting. The station STA can also do virtual carrier sensing by transmitting a request-to-send frame RTS to the intended receiver, the access point AP or another station STA, and by waiting for a clear-to-send frame CTS from the intended receiver. The RTS frame advertises the duration of the intended transmission and the duration may also be transmitted in the CTS frame. In some embodiments, the use of the RTS-CTS frames entails extra overhead and the mechanism may be dropped for smaller packets communication, using them only for larger packets.

In an embodiment of the invention, the system 100 comprises a first group of stations ST1-STA3 capable of transmitting and receiving DSSS/CCK modulated data and a second group of stations STA4-STA6 capable of transmitting and receiving OFDM modulated data. A station STA1-STA3 cannot understand OFDM modulated data received from/transmitted to one of the stations STA4-STA6. Thus, stations STA1-STA3, which cannot decode OFDM modulated data, may not be able to follow collision avoidance mechanism.

In order to provide high data throughput, the system 100 allocates a period of time to OFDM data transfer only.

Figure 3:
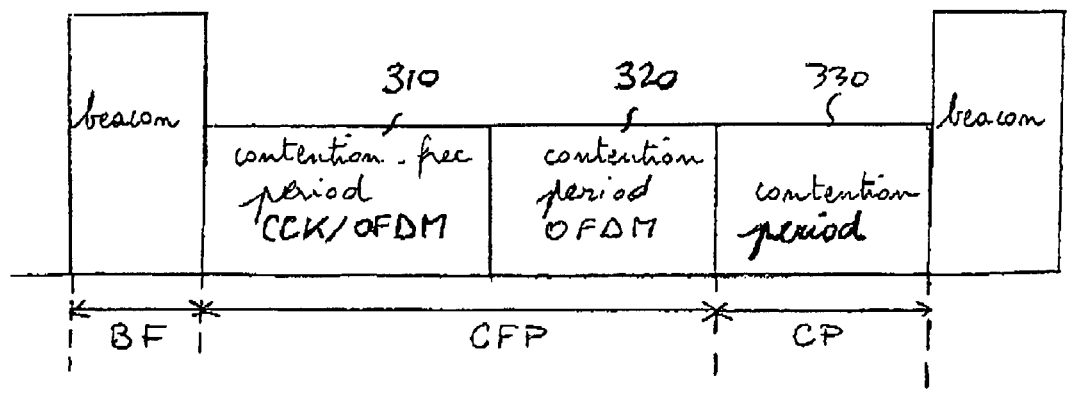
FIG. 3 is a timing diagram showing communication periods of the invention.

A timing diagram of how the system 100 operates is given in FIG. 3. The access point AP initiates a contention-free period CFP by transmitting a beacon frame BF to the stations STA1-STA6. The contention-free period CFP is followed by a contention period CP. The contention-free period CFP consists of a first sub-part, a CCK/OFDM contention-free period 310 and a second sub-part, an OFDM contention period 320. In this embodiment, the CCK/OFDM contention-free period 310 occurs before the OFDM contention period 320 however this order may be inversed.

The location and/or duration of the OFDM contention period 320 may be transmitted in an information element of the beacon frame BF.

During the period 310, the CCK stations STA1-STA3 and the OFDM stations STA4-STA6 communicate with the access point AP when polled by the access point AP as mentioned above. In this embodiment, the access point AP may have been made aware of the OFDM capability of the stations STA4-STA6. To this end, an information field indicating the OFDM capability may be exchanged when the station STA4-STA6 joins the network, e.g. during authentication. An OFDM bit of the information field may be reserved for indicating OFDM capability of the station STA4-ST6. Thus, when the access point AP polls or needs to access to a station STA during the contention-free period 310, it will access it using DSSS/CCK or OFDM modulation based on the known capabilities of the station STA. The station STA may then respond to the access point AP using the same modulation as it was addressed with. In one embodiment of the invention, the access point AP converts received OFDM (or DSSS/CCK) modulated data into DSSS/CCK (OFDM) modulated data for transmission to the receiving station based on respective capabilities of the transmitting and receiving stations.

During the period 320, a CCK station STA1-STA3 communicates with the access point AP when polled by the access point AP. In this embodiment, the access point AP is configured not to poll the stations STA1-STA3 during the period 320 and as a result, the stations STA1-STA3 may not transmit data during the period 320. During this period 320, the OFDM stations STA4-STA6 communicate with each other or with the access point AP based on a distributed coordination function. Such an OFDM contention period 320 enables to load the medium with pure OFDM data traffic and thereby enables high data throughput.

As mentioned above, a station STA4-STA6 gains access to the medium during the period 320 by sending a request-to-send RTS frame to the intended receiver and waits to receive a clear-to-send CTS frame from the intended receiver to start transmitting. In this embodiment, only OFDM stations may communicate during the period 320. As a result, the RTS and CTS frames are not necessarily modulated using DSSS/CCK modulation and may instead be OFDM modulated thereby enabling to reduce the data overhead and to improve the bandwidth efficiency.

The contention-free period CFP is then followed by the contention period 330. During period 330, both the legacy devices STA1-STA3 and the OFDM devices STA4-STA6 may compete for the medium and transmit data. Alternatively, only the legacy devices STA1-STA3 may communicate during the contention period 330.

In one embodiment of the invention, the stations STA1-STA6 may transmit DSSS/CCK modulated data only. The stations STA4-STA6 then need to send DSSS/CCK modulated RTS and CTS frames.

Figure 4:
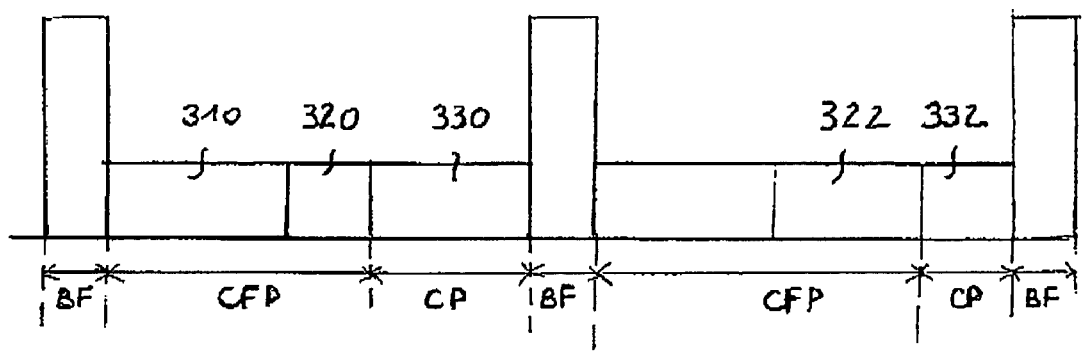
FIG. 4 shows request-to-send and clear-to-send frames of the invention.

In another embodiment, the stations STA4-STA6 may communicate using either the CCK modulation or the OFDM modulation. Thus, alternative RTSA and CTSA frames are introduced as shown in FIG. 4. If one of the OFDM station STA4-STA6 or the access point AP desires to transmit OFDM data during the contention period 330, it may transmit such alternative RTSA frame that comprises a field indicating that OFDM modulated data is or will be transmitted. This alternative RTSA frame informs the receiving station that OFDM modulation will be used. For example, one of the OFDM stations STA4-STA6 or the access point AP sends a request-to-send frame RTSA including an element which requests the receiving station to use either OFDM or DSSS/CCK modulation for the data. The RTSA frame is modulated in DSSS/CCK. The receiving station then in its clear-to-send CTSA frame indicates whether it accepts or refuses the OFDM modulation. If the receiving station refuses the OFDM modulation, the station STA4-STA6 uses the DSSS/CCK modulation.

Figure 5:
FIG. 5 shows dynamic adjustments of the sub-contention period and of the contention period.
Figure 5:

In another embodiment of the invention, the access point AP dynamically adjusts the duration of the contention period 320 based on the respective bandwidth requirements of the OFDM stations STA4-STA6. Thus, the more bandwidth is required from the stations STA4-STA6 relative to the stations STA1-STA3, the longest the contention period 320 will be. Alternately, the access point AP may also adjust the duration of the contention period 320 based on the number of stations capable of OFDM modulation. In case the proportion of OFDM stations STA is high relative to the total number of stations in the network, the access point AP will increase the duration of the contention period 320. FIG. 5 shows a dynamic adjustment of the sub-contention period 320 to the sub-contention period 322 and a dynamic adjustment of the contention period 330 to the contention period 332.

The invention claimed is:

1. A system comprising:
   a first station configured to transmit and receive data modulated using a first modulation scheme;
   a second station configured to transmit and receive data modulated using a second modulation scheme;
   an access point for communicating with the first and the second stations; and
   wherein, the access point transmits a beacon frame indicating a beginning of a first period during which the first station is not allowed to contend for medium access, the first period being followed by a contention period during which the first station is allowed to contend for medium access, the beacon frame also indicating a location of a contention sub-period within the first period during which the second station is enabled to transmit data modulated according to the second modulation scheme following a distributed coordination function access mechanism.

2. The system of claim 1, wherein the first modulation scheme is a DSSS/CCK modulation scheme.

3. The system of claim 1, wherein the second modulation scheme is an OFDM modulation scheme.

4. The system of claim 1, wherein the contention sub-period occurs at the end of the first period.

5. The system of claim 1, wherein the access point dynamically adjusts the duration of the contention sub-period.

6. The system of claim 5, wherein the access point further adjusts the duration of the contention sub-period based on respective bandwidth requirements of the first and second stations.

7. The system of claim 5, wherein the access point further adjusts the duration of the sub-contention period based on respective numbers of devices using the first and the second modulation schemes.

8. The system of claim 1, wherein during the contention period, the second station sends a request-to-send frame comprising information representative of the second modulation scheme.

9. The system of claim 1, wherein during the contention sub-period, the second station transmits request-to-send and clear-to-send frames modulated according to the second modulation scheme.

10. The system of claim 1, wherein the second station sends an information field representative of the second modulation capability when joining the system.

11. The system of claim 1, wherein the system operates under the IEEE 802.11 specification.

12. An access point for communicating over a local area network with a first station configured to transmit and receive data modulated according to a first modulation scheme and with a second station configured to transmit and receive data modulated according to a second modulation scheme, wherein the access point transmits a beacon frame indicating a beginning of a first period during which the first station is not allowed to contend for medium access, the first period being followed by a contention period during which the first station is allowed to contend for medium access, the beacon frame also indicating a location of a contention sub-period within the first period during which the second station is enabled to transmit data modulated according to the second modulation scheme following a distributed coordination function access mechanism.

13. The access point of claim 12, wherein the first modulation scheme is a DSSS/CKK modulation scheme.

14. The access point of claim 12, wherein the second modulation scheme is an OFDM modulation scheme.

15. The access point of claim 12, wherein the access point dynamically adjusts the duration of the contention sub-period.

16. The access point of claim 12, wherein during the contention period, the access point sends a request-to-send frame comprising information representative of the second modulation scheme.

17. The access point of claim 12, wherein during the contention sub-period, the access point transmits request-to-send and clear-to-send frames modulated according to the second modulation scheme.

18. The access point of claim 12, wherein during the contention period, the access point receives from the second station a request-to-send frame comprising information representative of the second modulation scheme.

19. The access point of claim 12, wherein the access point received from the second station an information field representative of the second modulation capability when the second station joins the local area network.

20. A station in a local area network, the first station being configured to transmit and receive data using a first modulation scheme, the local area network further comprising a second station configured to transmit and receive data using a second modulation scheme and an access point for communicating with both stations, wherein the first station receives a beacon frame transmitted by the access point indicating a beginning of a first period during which the first station is not allowed to contend for medium access, the first period followed by a contention period during which the first station is allowed to contend for medium access, the beacon frame also indicating a location of a contention sub-period within the first period during which the second station enabled to transmit data according to the second modulation scheme and following a distributed coordination function access mechanism.

* * * * *